Figure 1:
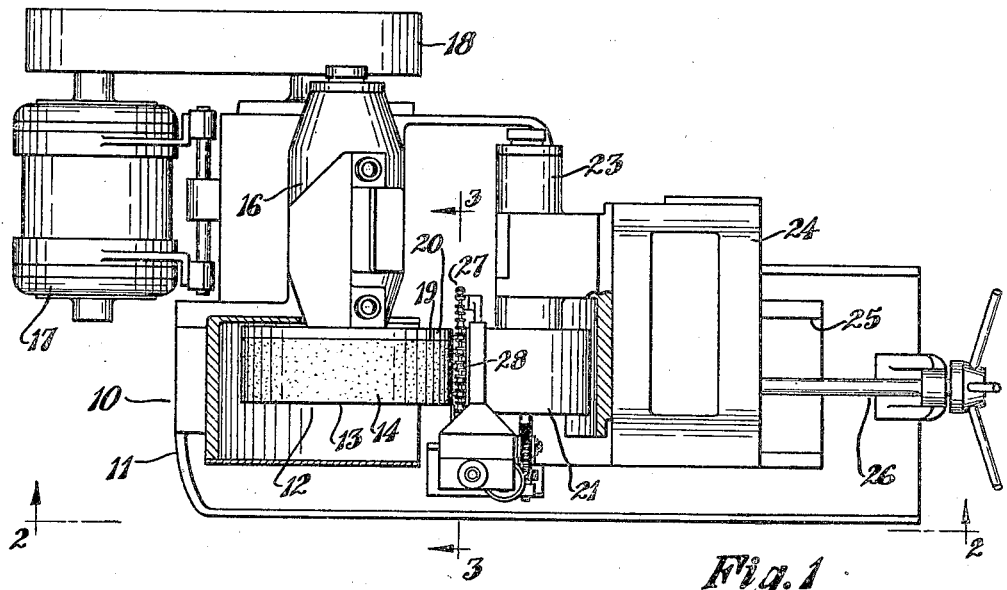

March 21, 1939.　　　G. D. WINKLER　　　2,151,365
MACHINE FOR CENTERLESS GRINDING ARTICLES SUCH AS TAPERED ROLLERS
Filed Aug. 26, 1937　　　5 Sheets-Sheet 1

Inventor
George D. Winkler
Attorneys

March 21, 1939.  G. D. WINKLER  2,151,365
MACHINE FOR CENTERLESS GRINDING ARTICLES SUCH AS TAPERED ROLLERS
Filed Aug. 26, 1937  5 Sheets-Sheet 2

Inventor
George D. Winkler
Attorneys

March 21, 1939.    G. D. WINKLER    2,151,365
MACHINE FOR CENTERLESS GRINDING ARTICLES SUCH AS TAPERED ROLLERS
Filed Aug. 26, 1937    5 Sheets-Sheet 4

Inventor
George D. Winkler
Attorneys

March 21, 1939. G. D. WINKLER 2,151,365
MACHINE FOR CENTERLESS GRINDING ARTICLES SUCH AS TAPERED ROLLERS
Filed Aug. 26, 1937 5 Sheets-Sheet 5

Inventor
George D. Winkler

Patented Mar. 21, 1939

2,151,365

UNITED STATES PATENT OFFICE

2,151,365

MACHINE FOR CENTERLESS GRINDING ARTICLES SUCH AS TAPERED ROLLERS

George D. Winkler, Stark County, near Dalton, Ohio, assignor to Tyson Roller Bearing Corporation, Massillon, Ohio, a corporation of Delaware Application August 26, 1937, Serial No. 161,016

24 Claims. (Cl. 51—103)

This application for United States Letters Patent constitutes a continuation in part of my application for United States Letters Patent filed December 31, 1936, Serial No. 118,600.

My invention relates to methods and machines for centerless grinding articles such as tapered rollers for tapered roller bearings.

In centerless grinding machines for grinding tapered rollers, each having a grinding wheel and a regulating wheel, the so-called through-feeding of successive rollers endwise across the grinding surface of the wheel has been effected by providing one or more helical grooves in the regulating wheel, the bottom of the groove being angled so as to position a tapered roller interposed between the groove and the grinding wheel with its longitudinal axis in a plane usually horizontal and with succeeding elements of the roller in the same plane contacting against succeeding elements of the usual cylindric grinding surface of the grinding wheel, and one side face of the groove abutting against an end of the tapered roller, serves to move the roller in the plane endwise and crosswise of the grinding surface, the longitudinal axis of the roller being at an angle with the elements of the grinding surface, whereby successive tapered rollers may be continuously positioned and fed across the grinding surface.

Through-feeding of tapered rolls in a centerless grinding machine enables primarily the attainment of a very high rate of production for the finished ground rollers as distinguished from the in-feeding method, in which the regulating wheel is angled with respect to the grinding wheel and each roll is fed into and out of grinding engagement between the angled grinding wheel and regulating wheel.

The usual through-feed centerless grinding machines, as above generally described, require a differently grooved regulating wheel for each differently angled roller and also for rollers differing in length by any substantial amount even though having the same angle of taper.

Each grooved reguating wheel thus required is relatively expensive, for example, such a wheel may cost in 1936 as much as $500 for handling any particular tapered roller.

Another disadvantage in centerless grinding machines having grooved regulating and feed wheels arises from the fact that it is practically impossible to provide for take-up or accommodation between the grinding wheel and the grooved regulating wheel for the material ground from the roller as it passes across the wheel, except by angling the grinding wheel.

In consequence of this in such a machine, there is substantially no accurate grinding action in a substantial portion of the first several passes of a roller blank through the grinding machine, and as many as four passes for each roller are required to produce the finished ground roller of the desired precision.

From another standpoint, in centerless grinding machines having relatively large grooved regulating and feed wheels, the speed of the feed determines the speed of rotation of the wheel, and for small rollers this speed becomes so great as to spin the rollers and not permit proper grinding action.

Primarily because of the relatively high cost of making the grooved regulating and feed wheels, it is not practically possible to utilize through-feeding in a centerless grinding machine of this type, for any but relatively large production runs of rollers. Consequently for small runs of rollers for a limited number of bearings, it is necessary to use an in-feed centerless grinding machine or in some cases to grind the rollers on centers, at a relatively great cost.

The objects of the present improvements include the provision of an improved method and machine for centerless grinding, preferably having through-feed, and by which precision grinding may be effected on each article being ground across the entire width of the grinding surface, or in other words by which accommodation or take-up is provided for the material being removed from the articles being ground as grinding continues.

Further objects of the present improvements include the provision of a through-feed centerless grinding machine, particularly adapted for grinding tapered rollers for tapered roller bearings, and in which the roller positioning and feed mechanism is arranged so as to handle different sizes and tapers of rollers at a relatively low tooling cost for each particular size or taper.

Further objects of the present improvements include the provision of a precision centerless grinding machine particularly adapted for grinding tapered rollers for tapered roller bearings, and which may on the one hand be economically adapted for mass production runs of large numbers of rollers, and on the other hand may be economically adapted to limited production runs of relatively small numbers of rollers.

Further objects of the improvements include the provision of improved general and detail arrangements of certain parts of the improved centerless grinding machine, so as to attain an improved mode of operation for carrying out the improved method hereof.

The foregoing and other objects are attained by the methods, machines, apparatus, parts, combinations, and sub-combinations, which comprise the present invention, and the nature of which is set forth in the following general statement, and preferred embodiments of which are set forth in the following description, and which are particularly and distinctly pointed out and set forth in the appended claims forming part hereof.

The nature of the improved method of the present invention may be stated in general terms as including the centerless grinding method for grinding an elongated article, particularly a tapered roller, which includes moving a grinding surface so that succeeding elements of the grinding surface are brought into a certain reference plane, supporting the elongated article so that its longitudinal axis has successive controlled positions with respect to the reference plane, rotating the article about the axis and applying pressure on the article so that its rotating surface contacts with the grinding surface, and moving the article endwise of itself and crosswise of the direction of movement of the grinding surface, the forces operating on the article being such that the axis of the article approaches the grinding surface as grinding continues.

Preferably the axis of the article is maintained substantially in the reference plane or with a very slight displacement therefrom.

The elements of the article being ground are thus always substantially parallel with the grinding surface, and grinding takes place throughout the entire movement of the article crosswise of the direction of movement of the grinding surface, the axis of the article approaching the grinding surface as grinding continues, whereby accommodation or take-up is provided for the material being removed from the article as grinding continues.

The improved method as applied to the continuous grinding of successive elongated articles, is carried out by applying upon each article while in contact with the grinding surface a separate rotating force and pressure towards the grinding surface, whereby each article being ground is subject to a different rotating force and pressure towards the grinding surface than the similar forces and pressures applied to the other articles, and thus accommodation or take-up is provided for the material being removed from all of the successive articles as grinding continues.

The nature of the improved machine or apparatus of the present invention may be stated in general terms as including grinding means having a moving grinding surface, preferably a cylindric grinding wheel, means for moving and applying pressures upon a work piece being ground, which work piece may be an elongated article, particularly a tapered roller, and means for supporting the work piece being ground as it moves with respect to the grinding surface.

The work piece moving and pressure applying means includes a rotary member, preferably a spool, having an elongated portion, which is tapered when arranged for tapered rollers, for contact with elements of the article being ground; and the rotary member has associated therewith preferably integrally, two flange means preferably cylindric. One of the preferably cylindric flange means contacts at one side with an end of the article being ground. Means preferably including a cylindric regulating wheel are provided for rotating the rotary member, preferably by rotary engagement of the moving cylindric surface of the regulating wheel with the cylindric faces of the flange means which are preferably located at opposite ends of the elongated portion of the rotary member and are preferably secured to or in one piece with the same. The article being ground, which is located and engaged between the rotary member and the grinding surface, is thus rotated.

Means for moving or cross feeding the rotary member and the article engaged thereby crosswise of the direction of movement of the grinding surface are provided, preferably in the form of endless belt means, in which means rotatably mounting the rotary member are included as a portion. The endless belt means are flexible and have flexible connections with the means rotatably mounting the rotary member.

Preferably a plurality of flexibly endwise connected mounting means are provided for a plurality of the rotary members for attaining continuous through-feed of successive articles being ground.

The apparatus furthermore includes improved general and detail arrangements of certain parts, as hereinafter set forth and claimed.

Figure 2:
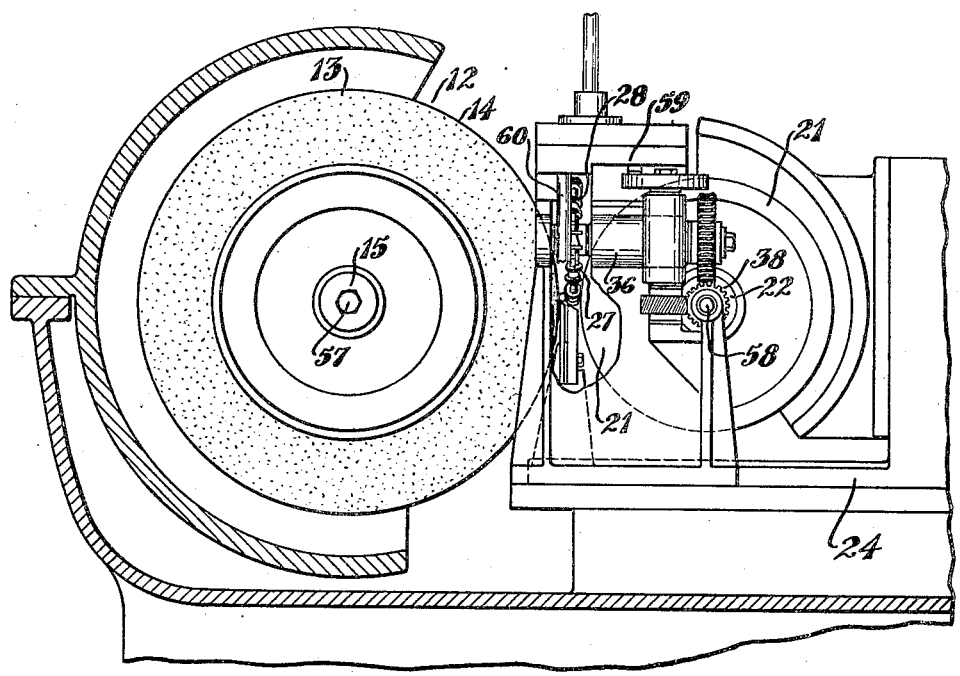
Figure 4:
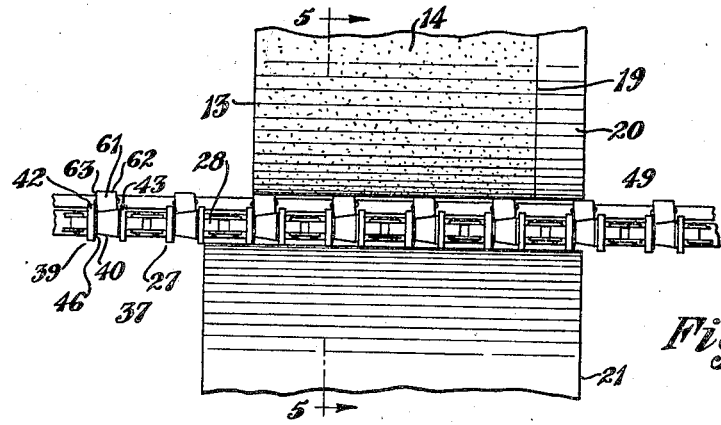
Figure 3:
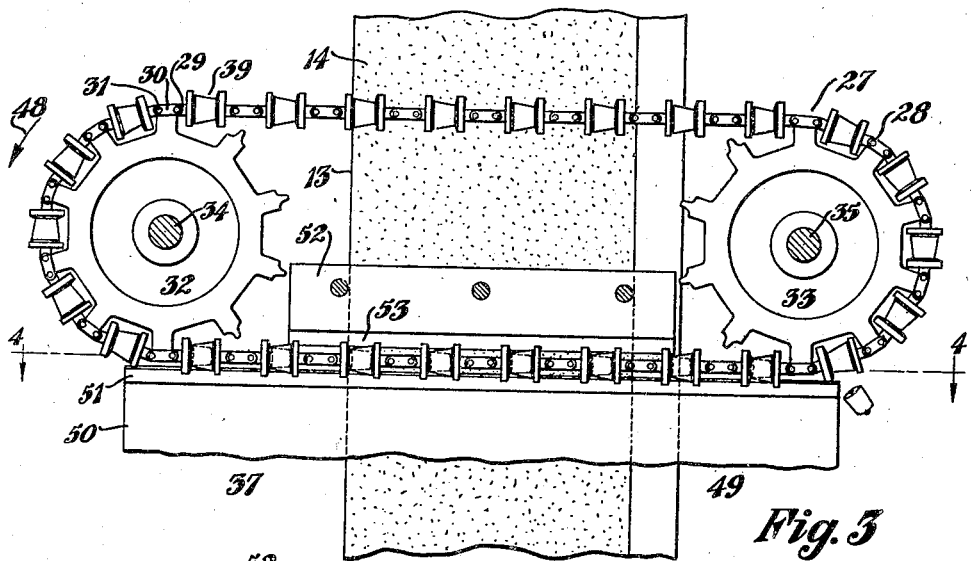
Figures 5, 6:
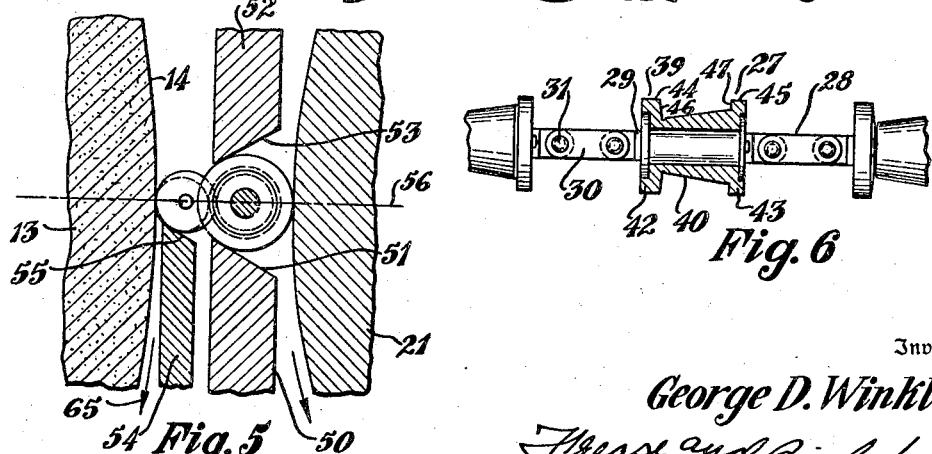
Figure 7:
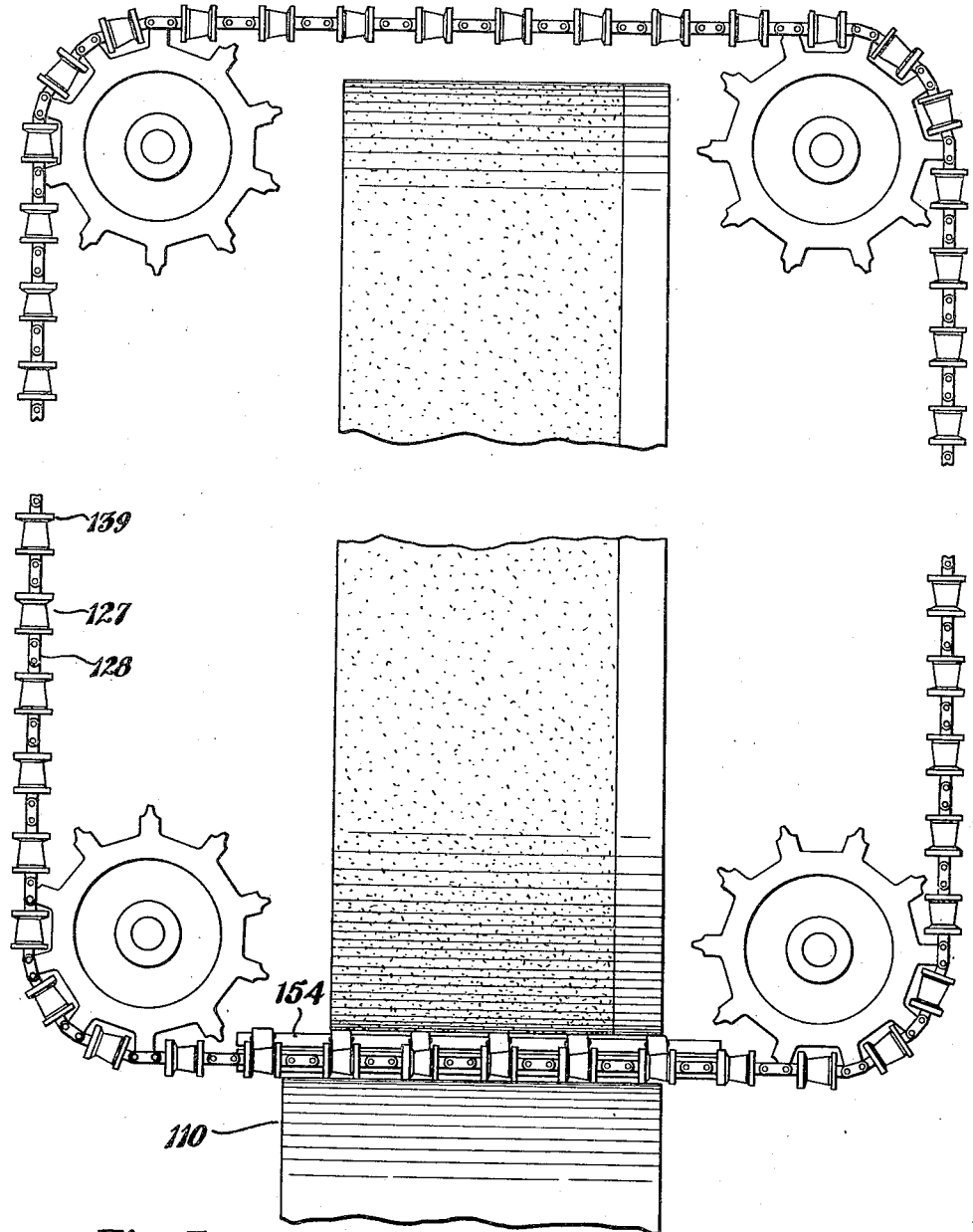
Figure 9:
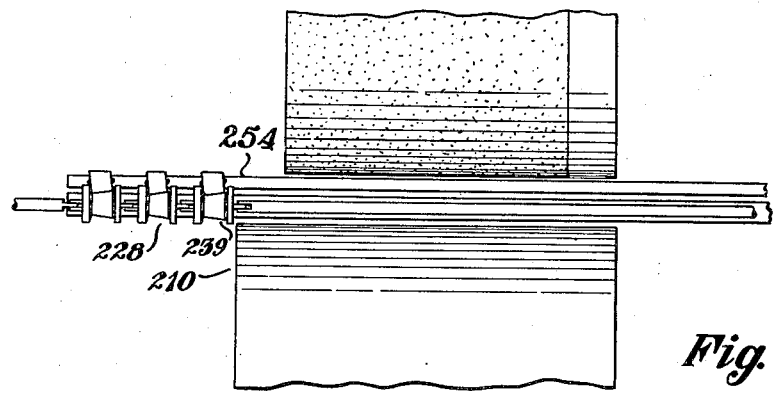
Figure 8:
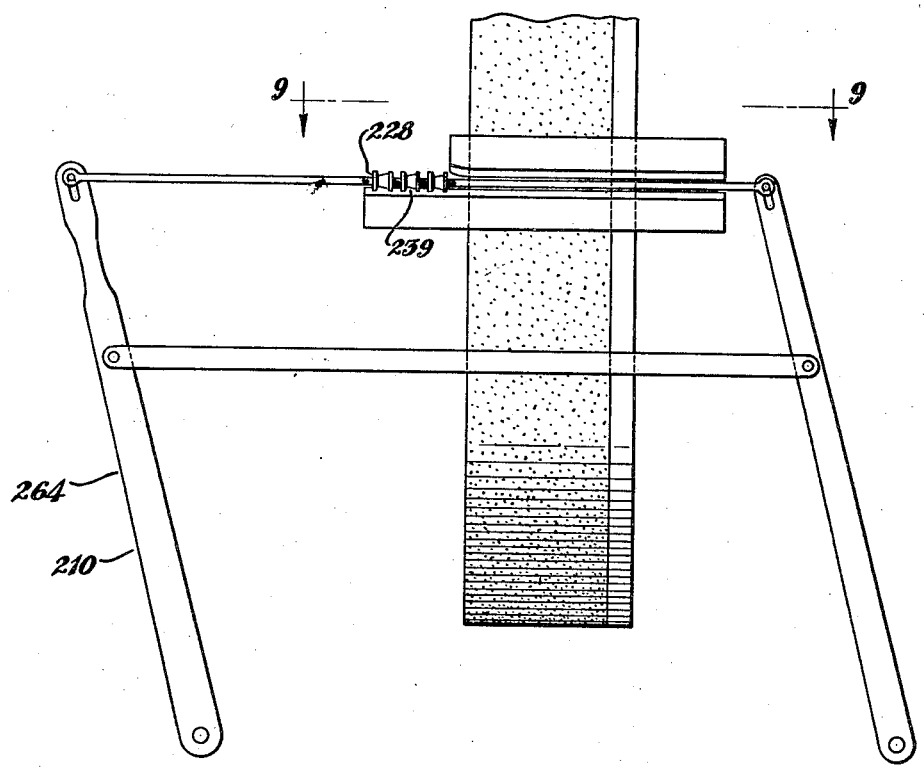
Figure 10:
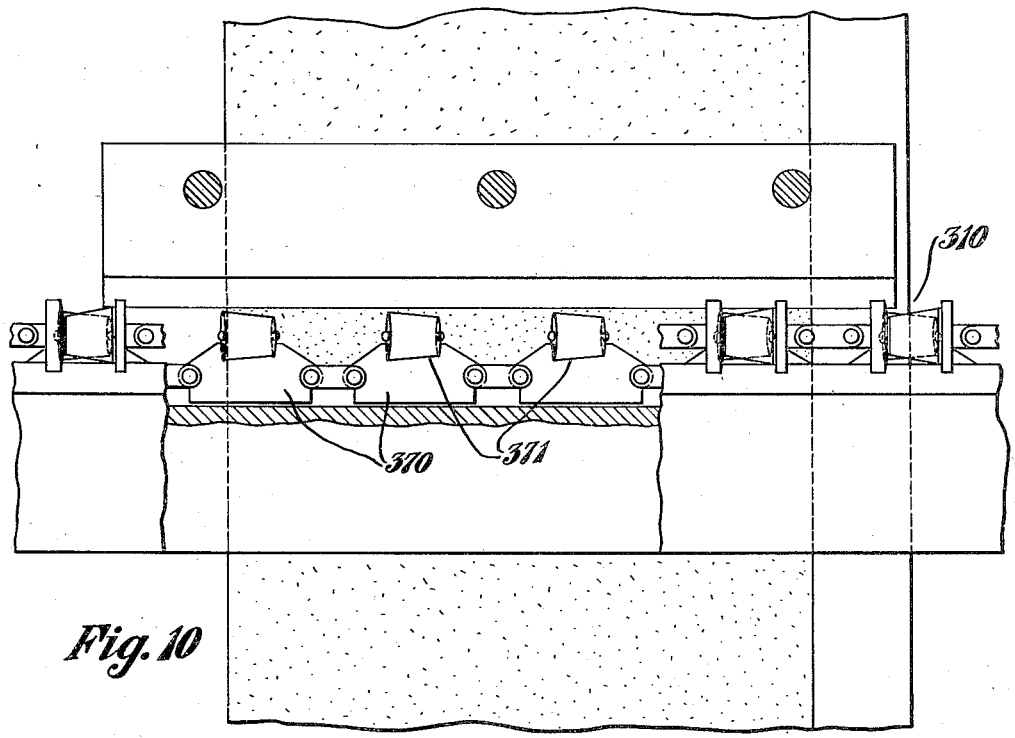
Figure 11:
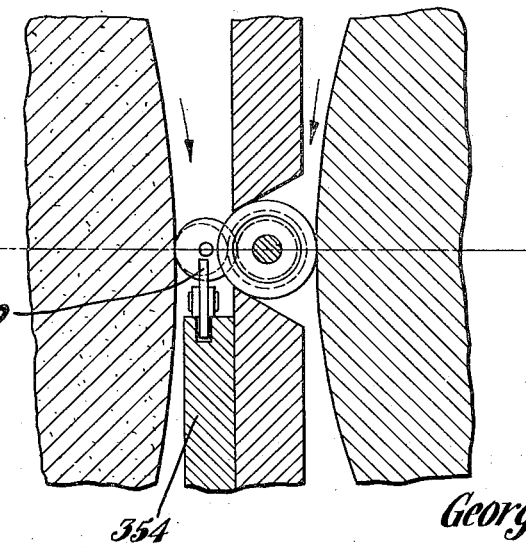

By way of example, several embodiments of the improved machines hereof each adapted for carrying out the improved method hereof, are illustrated in the accompanying drawings forming part hereof, in which Figure 1 is a top plan view with portions in section, of one embodiment of the improved machine particularly adapted for mass production operation, and in which the improved cross feed means includes a flexible endless link belt operating in a vertical plane;

Fig. 2, an enlarged fragmentary front elevation thereof looking in the direction of the arrows 2—2, Fig. 1 with portions broken away and other portions shown in section;

Fig. 3, an enlarged fragmentary sectional view thereof as on line 3—3, Fig. 1;

Fig. 4, a fragmentary plan sectional view thereof as on line 4—4, Fig. 3;

Fig. 5, an enlarged fragmentary sectional view thereof as on line 5—5, Fig. 4;

Fig. 6, a detached fragmentary view of the endless flexible chain having collared shaft links rotatably mounting the preferred rotary spool members of the improved work piece rotating and pressure applying means of the improved machine;

Fig. 7, a fragmentary diagrammatic view of a second embodiment of the improved machine hereof, in which the improved cross feed means includes an endless flexible link belt operating in a horizontal plane;

Fig. 8, a fragmentary diagrammatic view similar to Fig. 3 of a third embodiment of the improved machine hereof adapted for limited production operation;

Fig. 9, a fragmentary plan view thereof looking in the direction of the arrows 9—9, Fig. 8;

Fig. 10, a fragmentary enlarged view similar to Fig. 3 of a fourth embodiment of the improved machine hereof adapted for high precision operation; and Fig. 11, a fragmentary transverse sectional view thereof similar to Fig. 5.

Similar numerals refer to similar parts throughout the drawings.

The embodiment of the improved centerless grinding machine hereof illustrated in Figs. 1 to 6 inclusive and indicated generally at 10, includes a base 11 upon which is operatively mounted grinding means indicated generally by 12 and which as shown include a grinding wheel 13 having a cylindric grinding surface 14 and which is secured upon one end of a shaft 15 which is journalled in a bearing housing 16.

The machine 10 includes a drive motor 17 which rotates the grinding wheel shaft 15 and the grinding wheel 13 thereon by suitable power transmission means including in part the belt means 18, and not otherwise shown.

For the purposes of the present improvements the grinding wheel 13 is preferably provided at the discharge side 19 thereof with a non-grinding extension wheel 20.

The machine 10 furthermore includes a regulating wheel 21 secured upon a shaft 22 which is journalled in a bearing housing 23 secured upon a slide bracket 24, and the slide bracket 24 is slidable in a usual manner towards and away from the grinding wheel 13 on gibs 25.

Usual screw means indicated generally by 26 are provided for adjusting the position of the slide bracket 24 and thus of the regulating wheel 21 with respect to the grinding wheel 13.

The regulating wheel 21 is driven in a usual manner through power transmission means not shown by the motor 17.

The parts of the improved centerless grinding machine 10 thus far described, with the exception of the non-grinding extension 20 of the grinding wheel 13, are similar to substantially any centerless grinding machine not having a grooved regulating wheel.

The improved centerless grinding machine 10 for each work piece or article or roller being ground furthermore includes improved work piece or article or roller moving and pressure applying means indicated generally by 27, and which as shown are adapted for handling tapered rollers, and are operative between the grinding wheel 13 and the regulating wheel 21.

The improved work piece or article or roller moving and pressure applying means 27 are provided with cross feed means as shown in the form of an endless link belt 28 including alternate collared shaft links 29 and spaced pairs of bar links 30 connected with each other in a usual manner by transverse pins 31 extending through apertures provided in the ends of the shaft links 29 and bar links 30.

The link belt 28 thus formed is operatively mounted on sprockets 32 and 33 located at opposite sides of the grinding wheel 13 and regulating wheel 21, the sprockets 32 and 33 being secured on shafts 34 and 35 respectively, which are journalled in suitable bearing brackets provided on the machine base 10. The bearing bracket 36 for the shaft 34 for the sprocket 32 at the work piece or roller entrance side 37 of the machine is shown in Fig. 2, and the shaft 34 extends beyond the bearing bracket 36 and is provided with a worm gearing drive connection indicated generally by 38 with the shaft 22 of the regulating wheel 21.

In the improved centerless grinding machine 10 the link belt 28 is arranged to operate in a vertical plane between the grinding wheel 13 and the regulating wheel 21.

Each collared shaft link 29 mounts work piece moving and pressure applying means 27 including a rotary member which is preferably, as shown, included in a spool 39 as an elongated portion 40 which, as shown, is tapered for handling tapered rollers, and preferably, as shown, each spool 39 includes in one piece, as parts of the particular work piece moving and pressure applying means 27 opposite flange means, as shown, in the form of cylindric flanges 42 and 43 which preferably have the cylindric peripheries or faces 44 and 45 respectively and opposite side faces 46 and 47.

As best shown in Figs. 3, 4, and 5, the sprocket 32 is driven so as to turn in the direction of the arrow 48 so that the lower horizontal portions of the moving link belt 28 moves from the work piece or roller entrance side 37 of the machine crosswise of the direction of movement of the cylindric grinding surface 14 of the grinding wheel to the work piece or roller exit or discharge side 49 of the machine.

The lower horizontal side portion of the link belt 28 between the sprockets 32 and 33 constitutes the working portion of the belt, and cross guide means are provided for the rotary spool members 39 on the working portion of the belt as they move crosswise of the direction of movement of the grinding surface 14 of the grinding wheel 13.

As shown the cross guide means for the rotary spool members 39 include a lower guide bar 50 which extends between the grinding wheel 13 and the regulating wheel 21 below the lower side of the link belt 28, and which has an upper horizontally extending beveled slide guide face 51 providing a slide guide for lower portions of the peripheries or faces 44 and 45 of the flanges 42 and 43 of the rotary spool members 39.

The cross guide means for the rotary spool members 39 furthermore include an upper guide bar 52 extending horizontally between the grinding wheel 13 and the regulating wheel 21, and having a lower horizontally extending beveled slide guide face 53 providing a slide guide for upper portions of the peripheries of the flanges of the rotary spool members 39.

In the machine 10, work piece supporting means are also provided, as shown, including a slide support bar 54 which extends horizontally between the rotary spool members 39 and the grinding surface 14 of the grinding wheel 13, and the slide support bar 54 has an upper horizontally extending beveled slide support face 55 upon which slide portions of the work pieces or rollers being ground.

For the purposes of the present improvements the working or lower side of the link belt 28 moving crosswise between the grinding wheel 13 and the regulating wheel 21 and between the upper and lower cross guide bars 50 and 52, is arranged so that the longitudinal axes of the rotary spool members 39 passing between the cross guide bars 50 and 52 are located preferably substantially in a horizontal reference plane 56 in which are preferably located the axes of rotation 57 and 58 respectively of the grinding wheel 13 and the regulating wheel 21.

The tapered portions 40 of the rotary spool members 39 are arranged so that their larger ends terminating at the flanges 43 thereof are the front ends of the rotary members 39 as the same advance crosswise of the grinding wheel between the cross guide bars 50 and 52.

Automatic means indicated generally by 59 may be provided for delivering work piece blanks to the entrance side of the lower working portion of the link belt 28 and the rotary members carried thereby as through a tube 60.

The operation of the improved centerless grinding machine 10 for each of the work pieces ground thereby, which, as shown, are tapered rollers, is as follows:

Each work piece or tapered roller 61 is applied at the entrance side 37 of the machine upon the upper slide support face 55 of the work piece slide support bar 54 with the tapered conical portion 62 of the roller 61 in contact with the tapered portion 40 of one of the rotary spool members 39, and with the larger end 63 of the roller in abutment with the side face 46 of the rotary spool member flange 42 at the rear end of the advancing rotary spool member 39, as best shown in Fig. 4.

The angle of the tapered portion 40 of each rotary spool member 39 is formed so that in the roller 61 engaged thereby as shown in Fig. 4, the elements of the roller 61 adjacent the grinding surface 14 of the grinding wheel 13 are substantially parallel therewith, and succeeding elements of the roller 61 in the plane 56 contact with succeeding elements of the grinding surface 14 in the same plane as grinding continues, the elements of the roller 61 contacting the grinding surface 14 always remaining substantially parallel with the grinding surface 14 throughout the entire grinding action.

The grinding wheel 13 is rotated to turn downwardly in the direction of the arrow 65 in Fig. 5 and the rotating regulating wheel 21 is adjusted to contact with the adjacent cylindric peripheries of succeeding rotary spool members 39 on the lower working side of the flexible endless link belt 28 so as to rotate the succeeding rotary spool members 39 as they pass crosswise between the regulating wheel and the grinding wheel and so that each roller 61 as it becomes engaged between its rotary member 39 and the grinding wheel is caused to rotate downwardly in the same direction as the grinding wheel 13, but at a slower speed depending on the size of roller.

As grinding continues and each roller 61 is moved crosswise of the direction of movement of the grinding surface by reason of the thrust received from the flange 42 of the rotary spool member 39 engaging the roller, the roller 61 is supported or positioned during its movement crosswise and against the grinding surface 14 so that succeeding elements of the roller in the plane 56 are always substantially parallel with the elements of the grinding surface 14, but there is provided sufficient side flexibility in the link belt 28 so that the longitudinal axis of the roller approaches slightly the grinding surface 14 as grinding continues and material is removed from the roller, whereby precision grinding takes place across the entire grinding surface 14 of the grinding wheel 13.

The non-grinding extension 20 preferably provided adjacent the discharge side 19 of the grinding wheel is opposed by an extended portion of the regulating wheel 21 so that the rollers being ground are maintained in the proper position until entirely free of the grinding surface 14.

The second embodiment of the improved centerless grinding machine, illustrated diagrammatically in Fig. 7 and indicated at 110, is generally similar to the embodiment 10 but includes a plurality of work piece moving and pressure applying means indicated generally by 127 having an endless link belt means 128 for the rotary spool members 139 which operate in a horizontal plane, instead of a vertical plane as in the machine 10.

In Figs. 8 and 9 is illustrated a third embodiment of the improved centerless grinding machine indicated generally by 210, and which is adapted for limited production operation.

In the machine 210 a relatively short length of flexible link belt 228 operatively mounts thereon a limited number of rotary members 239 which may be moved crosswise between the grinding wheel and the regulating wheel as by lever and link means indicated generally by 264.

Each of the machines 10, 110, and 210 includes a slide support bar 54, 154 and 254, respectively, for the work pieces being ground. When the work pieces are tapered rollers their lower elements rest upon the slide support face of the slide support bars, and the axis of rotation of any particular roller as it is fed through either of the machines 10, 110 or 210 is slightly displaced from the reference planes passing through the axes of the grinding wheels and regulating wheels, in the case of the machine 10, being the reference plane 56.

In Figs. 10 and 11 a fourth embodiment of the improved machine hereof is indicated generally by 310 and is generally similar to the machine 10, but includes for each tapered roller being ground supporting means including a roller positioning member 370 having an angled upper face 371 which is formed with respect to the reference plane passing through the centers of rotation of the grinding wheel and regulating wheel and thus through the succeeding grinding elements of the grinding wheel, so that the axis of rotation of the roller being ground lies in the reference plane.

A plurality of the roller supporting members 370 are link connected with each other and arranged to slide over a suitably positioned slide bar 354.

Each of the embodiments 10, 110, 210, and 310 of the present improvements are illustrated and described herein by way of example, and the scope of the present invention is not limited to the same or to the particular details thereof, but is commensurate with any and all novel subject matter contained herein which may at any time properly under the United States patent laws be set forth in the claims hereof or originating herein, the elements of any of which claims are intended to include their reasonable mechanical equivalents.

The present invention attains the objects set forth in the preamble hereof, which may be summarized and amplified as follows:

From the standpoint of the precision manufacture of either relatively small or relatively large quantities of tapered rollers, by the use of the present invention rollers may be ground very accurately in rarely more than two passes through the grinding machine because the rollers are not only always properly positioned with respect to the grinding wheel but also because accommodation is provided for the material being ground from the roller as grinding continues by reason of the side flexibility of the preferably endless belt moving means for the rotary spool members whereby the axis of rotation of the roller being ground gradually approaches the grinding surface as grinding continues.

From the standpoint of attaining economies in the tooling costs for any particular size roller, the use of a separate relatively small rotary spool member for each roller to be ground permits a tooling cost for the roller cross feed means which is very much less than the tooling costs for the roller cross feed means in a centerless grinding machine having a grooved regulating wheel.

The present invention also has further operating advantages in that the speed of the roller cross feed is independent of the speed of rotation of the regulating wheel, permitting these speeds to be adjusted by the operator with respect to each other to attain proper and desired results for any particular size roller, whereas with a grooved regulating wheel the speed of the same is fixed by the desired cross feed speed.

I claim:

1. In a centerless grinding machine, grinding means having a moving grinding surface, means for moving and applying pressures upon a tapered roller with respect to the moving grinding surface, the roller moving and pressure applying means including a rotary member having a tapered portion for contact with the tapered portion of the roller being ground and a flange portion for contact with an end of the roller being ground, means for rotating the rotary member and applying pressure thereagainst and towards the moving grinding surface and thus rotating the roller being ground which is located between the rotary member and the grinding surface and contacting the rotating surface of the roller against the grinding surface, and means for moving the rotary member endwise of itself and crosswise of the direction of movement of the grinding surface so that the flange of the rotary member engaging the end of the roller being ground serves to move the rotating roller being ground endwise of itself and crosswise of the direction of movement of the grinding surface.

2. In a centerless grinding machine, grinding means having a moving grinding surface, means for moving and applying pressures upon successive tapered rollers with respect to the moving grinding surface, the roller moving and pressure applying means including rotary members, one for each roller being ground, each rotary member having a tapered portion for contact with the tapered portion of the roller being ground and a flange portion for contact with an end of the roller, means for rotating the rotary members and applying pressure thereagainst and towards the moving grinding surface and thus rotating the rollers being ground which are located between the rotary members and the grinding surface and contacting the rotating surfaces of the rollers against the grinding surface, and means for moving the rotary members endwise of themselves and crosswise of the direction of movement of the grinding surface so that the flanges of the rotary members engaging the ends of the rollers being ground serve to move the rotating rollers being ground endwise of themselves and crosswise of the direction of movement of the grinding surface.

3. In a centerless grinding machine, grinding means having a moving grinding surface, means for moving and applying pressures upon a tapered roller with respect to the moving grinding surface, the roller moving and pressure applying means including a rotary member having a tapered portion for contact with the tapered portion of the roller being ground and a flange portion for contact with an end of the roller being ground, means for rotating the rotary member and applying pressure thereagainst and towards the moving grinding surface and thus rotating the roller being ground which is located between the rotary member and the grinding surface and contacting the rotating surface of the roller against the grinding surface, and means for moving the rotary member endwise of itself and crosswise of the direction of movement of the grinding surface so that the flange of the rotary member engaging the end of the roller being ground serves to move the rotating roller being ground endwise of itself and crosswise of the direction of movement of the grinding surface, and roller supporting means located between the grinding surface and the rotary member and extending crosswise of the direction of movement of the grinding surface and providing a support for the roller being ground as it moves with respect to the grinding surface.

4. In a centerless grinding machine, grinding means having a moving grinding surface, means for moving and applying pressures upon successive tapered rollers with respect to the moving grinding surface, the roller moving and pressure applying means including rotary members, one for each roller being ground, each rotary member having a tapered portion for contact with the tapered portion of the roller being ground and a flange portion for contact with an end of the roller, means for rotating the rotary members and applying pressure thereagainst and towards the moving grinding surface and thus rotating the rollers being ground which are located between the rotary members and the grinding surface and contacting the rotating surfaces of the rollers against the grinding surface, and means for moving the rotary members endwise of themselves and crosswise of the direction of movement of the grinding surface so that the flanges of the rotary members engaging the ends of the rollers being ground serve to move the rotating rollers being ground endwise of themselves and crosswise of the direction of movement of the grinding surface, and roller supporting means located between the grinding surface and the rotary members and extending crosswise of the direction of movement of the grinding surface and providing a support for the rollers being ground as they move with respect to the grinding surface.

5. In a centerless grinding machine, grinding means having a moving grinding surface, means for moving and applying pressures upon a tapered roller with respect to the moving grinding surface, the roller moving and pressure applying means including a rotary member having a tapered portion for contact with the tapered portion of the roller being ground and a flange portion for contact with an end of the roller being ground, means for rotating the rotary member and applying pressure thereagainst and towards the moving grinding surface and thus rotating the roller being ground which is located between the rotary member and the grinding surface and contacting the rotating surface of the roller against the grinding surface, and means for moving the rotary member endwise of itself and crosswise of the direction of movement of the grinding surface so that the flange of the rotary member engaging the end of the roller being ground serves to move the rotating roller being ground endwise of itself and crosswise of the direction of movement of the grinding surface, and cross guide means for the rotary member operative to guide the same in its movement crosswise of the direction of movement of the grinding surface.

6. In a centerless grinding machine, grinding means having a moving grinding surface, means for moving and applying pressures upon successive tapered rollers with respect to the moving grinding surface, the roller moving and pressure applying means including rotary members, one for each roller being ground, each rotary member having a tapered portion for contact with the tapered portion of the roller being ground and a flange portion for contact with an end of the roller, means for rotating the rotary members and applying pressure thereagainst and towards the moving grinding surface and thus rotating the rollers being ground which are located between the rotary members and the grinding surface and contacting the rotating surfaces of the rollers against the grinding surface, and means for moving the rotary members endwise of themselves and crosswise of the direction of movement of the grinding surface so that the flanges of the rotary members engaging the ends of the rollers being ground serve to move the rotating rollers being ground endwise of themselves and crosswise of the direction of movement of the grinding surface, and cross guide means for the rotary members operative to guide the same in their movements crosswise of the direction of movement of the grinding surface.

7. In a centerless grinding machine, grinding means having a moving grinding surface, means for moving and applying pressures upon a tapered roller with respect to the moving grinding surface, the roller moving and pressure applying means including a rotary member having a tapered portion for contact with the tapered portion of the roller being ground and a flange portion for contact with an end of the roller being ground, means for rotating the rotary member and applying pressure thereagainst and towards the moving grinding surface and thus rotating the roller being ground which is located between the rotary member and the grinding surface and contacting the rotating surface of the roller against the grinding surface, and means for moving the rotary member endwise of itself and crosswise of the direction of movement of the grinding surface so that the flange of the rotary member engaging the end of the roller being ground serves to move the rotating roller being ground endwise of itself and crosswise of the direction of movement of the grinding surface, and roller supporting means located between the grinding surface and the rotary member and extending crosswise of the direction of movement of the grinding surface and providing a support for the roller being ground as it moves with respect to the grinding surface, and cross guide means for the rotary member operative to guide the same in its movement crosswise of the direction of movement of the grinding surface.

8. In a centerless grinding machine, grinding means having a moving grinding surface, means for moving and applying pressures upon successive tapered rollers with respect to the moving grinding surface, the roller moving and pressure applying means including rotary members, one for each roller being ground, each rotary member having a tapered portion for contact with the tapered portion of the roller being ground and a flange portion for contact with an end of the roller, means for rotating the rotary members and applying pressure thereagainst and towards the moving grinding surface and thus rotating the rollers being ground which are located between the rotary members and the grinding surface and contacting the rotating surfaces of the rollers against the grinding surface, and means for moving the rotary members endwise of themselves and crosswise of the direction of movement of the grinding surface so that the flanges of the rotary members engaging the ends of the rollers being ground serve to move the rotating rollers being ground endwise of themselves and crosswise of the direction of movement of the grinding surface, and roller supporting means located between the grinding surface and the rotary members and extending crosswise of the direction of movement of the grinding surface and providing a support for the rollers being ground as they move with respect to the grinding surface, and cross guide means for the rotary members operative to guide the same in their movements crosswise of the direction of movement of the grinding surface.

9. In a centerless grinding machine, grinding means having a moving grinding surface, means for moving and applying pressures upon an elongated article with respect to the moving grinding surface, the article moving and pressure applying means including a rotary member movable towards the grinding surface and having an elongated portion for contact with elements of the elongated article being ground and flange means associated with the rotary member for contact with an end of the article being ground, common means for rotating the rotary member and applying pressure thereagainst and towards the moving grinding surface and thus rotating the article being ground which is located between the rotary member and the grinding surface and contacting the rotating surface of the article against the grinding surface, and means for moving the rotary member and flange means endwise of the rotary member and crosswise of the direction of movement of the grinding surface so that the flange means engaging the end of the article being ground serves to move the rotating article being ground endwise of itself and crosswise of the direction of movement of the grinding surface.

10. In a centerless grinding machine, grinding means having a moving grinding surface, means for moving and applying pressures upon successive elongated articles with respect to the moving grinding surface, the article moving and pressure applying means including for each article being ground a rotary member movable towards the grinding surface and having an elongated portion for contact with elements of the elongated article being ground and flange means associated with the rotary member for contact with an end of the article being ground, common means for rotating the rotary members and applying pressure thereagainst and towards the moving grinding surface and thus rotating the articles being ground which are located between the rotary members and the grinding surface and contacting the rotating surfaces of the articles against the grinding surface, and means for moving the rotary members and flange means endwise of the rotary members and crosswise of the direction of movement of the grinding surface so that the flange means engaging the ends of the articles being ground serve to move the rotating articles being ground endwise of themselves and crosswise of the direction of movement of the grinding surface.

11. In a centerless grinding machine, grinding means having a moving grinding surface, means for moving and applying pressures upon an elongated article with respect to the moving grinding surface, the article moving and pressure applying means including a rotary member movable towards the grinding surface and having an elongated portion for contact with elements of the elongated article being ground and flange means associated with the rotary member for contact with an end of the article being ground, means for rotating the rotary member and applying pressure thereagainst and towards the moving grinding surface and thus rotating the article being ground which is located between the rotary member and the grinding surface and contacting the rotating surface of the article against the grinding surface, and means for moving the rotary member and flange means endwise of the rotary member and crosswise of the direction of movement of the grinding surface so that the flange means engaging the end of the article being ground serves to move the rotating article being ground endwise of itself and crosswise of the direction of movement of the grinding surface, the crosswise moving means for the rotary member and flange means including means rotatably mounting the rotary member and mounting the flange means, flexible means connecting the ends of the mounting means, and means for imparting movement to the flexible means crosswise of the direction of movement of the grinding surface.

12. In a centerless grinding machine, grinding means having a moving grinding surface, means for moving and applying pressures upon successive elongated articles with respect to the moving grinding surface, the article moving and pressure applying means including for each article being ground a rotary member having an elongated portion for contact with elements of the elongated article being ground and flange means associated with the rotary member for contact with an end of the article being ground, means for rotating the rotary members and applying pressure thereagainst and towards the moving grinding surface and thus rotating the articles being ground which are located between the rotary members and the grinding surface and contacting the rotating surfaces of the articles against the grinding surface, and means for moving the rotary members and flange means endwise of the rotary members and crosswise of the direction of movement of the grinding surface so that the flange means engaging the ends of the articles being ground serve to move the rotating articles being ground endwise of themselves and crosswise of the direction of movement of the grinding surface, the crosswise moving means for the rotary members and flange means including means for each rotary member separately rotatably mounting the same and mounting its associated flange means, flexible means connecting the several mounting means, and means for imparting movement to the flexibly connected mounting means crosswise of the direction of movement of the grinding surface.

13. In a centerless grinding machine, grinding means having a moving grinding surface, means for moving and applying pressures upon an elongated article with respect to the moving grinding surface, the article moving and pressure applying means including a rotary member movable towards the grinding surface and having an elongated portion for contact with elements of the elongated article being ground and flange means associated with the rotary member for contact with an end of the article being ground, means for rotating the rotary member and applying pressure thereagainst and towards the moving grinding surface and thus rotating the article being ground which is located between the rotary member and the grinding surface and contacting the rotating surface of the article against the grinding surface, and means for moving the rotary member and flange means endwise of the rotary member and crosswise of the direction of movement of the grinding surface so that the flange means engaging the end of the article being ground serves to move the rotating article being ground endwise of itself and crosswise of the direction of movement of the grinding surface, the crosswise moving means for the rotary member and flange means including shaft means journal mounting the rotary member and mounting the flange means, flexible means connecting the ends of the shaft means, and means for imparting movement to the flexible means so as to move the shaft and the rotary member and flange means mounted thereon crosswise of the direction of movement of the grinding surface.

14. In a centerless grinding machine, grinding means having a moving grinding surface, means for moving and applying pressures upon successive elongated articles with respect to the moving grinding surface, the article moving and pressure applying means including for each article being ground a rotary member having an elongated portion for contact with elements of the elongated article being ground and flange means associated with the rotary member for contact with an end of the article being ground, means for rotating the rotary members and applying pressure thereagainst and towards the moving grinding surface and thus rotating the articles being ground which are located between the rotary members and the grinding surface and contacting the rotating surfaces of the articles against the grinding surface, and means for moving the rotary members and flange means endwise of the rotary members and crosswise of the direction of movement of the grinding surface so that the flange means engaging the ends of the articles being ground serve to move the rotating articles being ground endwise of themselves and crosswise of the direction of movement of the grinding surface, the crosswise moving means for the rotary members and flange means including shaft means for each rotary member separately journal mounting the same and mounting its associated flange means, flexible means connecting the several shaft means, and means for imparting movement to the flexibly connected shaft means so as to move the same and the rotary members and flange means mounted thereon crosswise of the direction of movement of the grinding surface.

15. In a centerless grinding machine, grinding means having a moving grinding surface, means for moving and applying pressures upon an elongated article with respect to the moving grinding surface, the article moving and pressure applying means including a rotary member having an elongated portion for contact with elements of the elongated article being ground and flange means associated with the rotary member for contact with an end of the article being ground, means for rotating the rotary member and applying pressure thereagainst and towards the moving grinding surface and thus rotating the article being ground which is located between the rotary member and the grinding surface and contacting the rotating surface of the article against the grinding surface, and means for moving the rotary member and flange means endwise of the rotary member and crosswise of the direction of movement of the grinding surface so that the flange means engaging the end of the article being ground serves to move the rotating article being ground endwise of itself and crosswise of the direction of movement of the grinding surface, the crosswise moving means for the rotary member and flange means including means rotatably mounting the rotary member and mounting the flange means, flexible means connecting at opposite ends with opposite ends of the mounting means and forming therewith an endless belt, and means for imparting movement to the endless belt so as to move the mounting means and the rotary member and flange means mounted thereon crosswise of the direction of movement of the grinding surface.

16. In a centerless grinding machine, grinding means having a moving grinding surface, means for moving and applying pressures upon successive elongated articles with respect to the moving grinding surface, the article moving and pressure applying means including for each article being ground a rotary member having an elongated portion for contact with elements of the elongated article being ground and flange means associated with the rotary member for contact with an end of the article being ground, means for rotating the rotary members and applying pressure thereagainst and towards the moving grinding surface and thus rotating the articles being ground which are located between the rotary members and the grinding surface and contacting the rotating surfaces of the articles against the grinding surface, and means for moving the rotary members and flange means endwise of the rotary members and crosswise of the direction of movement of the grinding surface so that the flange means engaging the ends of the articles being ground serve to move the rotating articles being ground endwise of themselves and crosswise of the direction of movement of the grinding surface, the crosswise moving means for the rotary members and flange means including means for each rotary member separately rotatably mounting the same and mounting its associated flange means, flexible means connecting adjacent ends of the several mounting means and flexible means connected at opposite ends with the outer ends of the outermost mounting means and the mounting means and flexible means thus forming an endless belt, and means for imparting movement to the endless belt so as to move the mounting means and the rotary members and flange means mounted thereon crosswise of the direction of movement of the grinding surface.

17. In a centerless grinding machine, a grinding wheel and a regulating wheel operatively mounted for rotation and having peripheral surfaces opposite each other, a rotatable work piece engaging and feed member having a groove formed therein and a peripheral portion, faces of the groove being formed for engaging one side and an end of a work piece, and means for rotatably mounting and moving the work piece engaging and feed member between the grinding wheel and the regulating wheel with the peripheral portion of the work piece engaging and feed member in rolling contact with the periphery of the regulating wheel, so that a work piece inserted between the engaging and feed member and the grinding wheel shall contact at opposite sides with one face of the groove of the engaging and feed member and the periphery of the grinding wheel and shall contact at one end with another face of the groove of the engaging and feed member and be moved endwise thereby across the periphery of the grinding wheel.

18. In a centerless grinding machine, grinding means and regulating means having opposite movable surfaces, a rotatable work piece engaging and feed member having a groove formed therein and a peripheral portion, faces of the groove being formed for engaging one side and an end of a work piece, and means for rotatably mounting and moving the work piece engaging and feed member between the movable face of the grinding means and the movable face of the regulating means with the peripheral portion of the work piece engaging and feed member in rolling contact with the movable face of the regulating means, so that a work piece inserted between the engaging and feed member and the movable face of the grinding means shall contact at opposite sides with one face of the groove of the engaging and feed member and the movable face of the grinding means and shall contact at one end with another face of the groove of the engaging and feed member and be moved endwise thereby across the movable face of the grinding means.

19. In a centerless grinding machine, a grinding wheel and a regulating wheel operatively mounted for rotation and having peripheral surfaces opposite each other, a rotatable work piece engaging and feed member having a groove formed therein and a peripheral portion, faces of the groove being formed for engaging one side and an end of a work piece, and flexible belt means for rotatably mounting and moving the work piece engaging and feed member between the grinding wheel and the regulating wheel with the peripheral portion of the work piece engaging and feed member in rolling contact with the periphery of the regulating wheel, so that a work piece inserted between the engaging and feed member and the grinding wheel shall contact at opposite sides with one face of the groove of the engaging and feed member and the periphery of the grinding wheel and shall contact at one end with another face of the groove of the engaging and feed member and be moved endwise thereby across the periphery of the grinding wheel.

20. In a centerless grinding machine, grinding means and regulating means having opposite movable surfaces, a rotatable work piece engaging and feed member having a groove formed therein and a peripheral portion, faces of the groove being formed for engaging one side and an end of a work piece, and flexible belt means for rotatably mounting and moving the work piece engaging and feed member between the movable face of the grinding means and the movable face of the regulating means with the peripheral portion of the work piece engaging and feed member in rolling contact with the movable face of the regulating means, so that a work piece inserted between the engaging and feed member and the movable face of the grinding means shall contact at opposite sides with one face of the groove of the engaging and feed member and the movable face of the grinding means and shall contact at one end with another face of the groove of the engaging and feed member and be moved endwise thereby across the movable face of the grinding means.

21. In a centerless grinding machine, a grinding wheel and a regulating wheel operatively mounted for rotation and having peripheral surfaces opposite each other, a rotatable work piece engaging and feed member having a groove formed therein and a peripheral portion, faces of the groove being formed for engaging one side and an end of a work piece, and endless flexible belt means for rotatably mounting and moving the work piece engaging and feed member between the grinding wheel and the regulating wheel with the peripheral portion of the work piece engaging and feed member in rolling contact with the periphery of the regulating wheel, so that a work piece inserted between the engaging and feed member and the grinding wheel shall contact at opposite sides with one face of the groove of the engaging and feed member and the periphery of the grinding wheel and shall contact at one end with another face of the groove of the engaging and feed member and be moved endwise thereby across the periphery of the grinding wheel.

22. In a centerless grinding machine, grinding means and regulating means having opposite movable surfaces, a rotatable work piece engaging and feed member having a groove formed therein and a peripheral portion, faces of the groove being formed for engaging one side and an end of a work piece, and endless flexible belt means for rotatably mounting and moving the work piece engaging and feed member between the movable face of the grinding means and the movable face of the regulating means with the peripheral portion of the work piece engaging and feed member in rolling contact with the movable face of the regulating means, so that a work piece inserted between the engaging and feed member and the movable face of the grinding means shall contact at opposite sides with one face of the groove of the engaging and feed member and the movable face of the grinding means and shall contact at one end with another face of the groove of the engaging and feed member and be moved endwise thereby across the movable face of the grinding means.

23. In a centerless grinding machine, work piece engaging and feed means including a rotatable work piece engaging and feed member movable laterally and having a groove formed therein and a peripheral portion, faces of the groove being formed for engaging one side and an end of a work piece, and flexible means for rotatably mounting and moving the work piece engaging and feed member endwise in the direction of its axis of rotation.

24. In a centerless grinding machine, work piece engaging and feed means including a rotatable work piece engaging and feed member having a groove formed therein and a peripheral portion, faces of the groove being formed for engaging one side and an end of a work piece, and flexible belt means for rotatably mounting and moving the work piece engaging and feed member endwise in the direction of its axis of rotation.

GEORGE D. WINKLER.